Patented May 6, 1930

1,757,496

UNITED STATES PATENT OFFICE

JAMES BADDILEY, PERCY CHORLEY, AND RAINALD BRIGHTMAN, OF MANCHESTER, ENGLAND, ASSIGNORS TO BRITISH DYESTUFFS CORPORATION LIMITED, OF MANCHESTER, ENGLAND, A CORPORATION OF GREAT BRITAIN

MANUFACTURE OF NEW AZO DYES

No Drawing. Application filed March 2, 1927, Serial No. 172,199, and in Great Britain June 25, 1926. Renewed September 6, 1929.

We have found that if 2-amino-8-naphthol-6-sulphonic acid is mixed in aqueous solution with an equimolecular proportion of a suitable aniline or naphthylamine derivative, that is to say, a primary aromatic amino body, other than an aminonaphthol or an aminonaphthol-sulphonic acid, and the mixture is treated with phosgene in the presence of sodium acetate or alkalies, there is formed an unsymmetrical urea having the constitution represented by the general formula:—

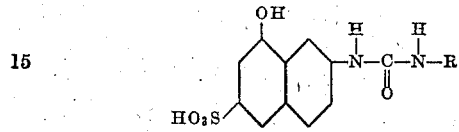

in which R denotes a non-hydroxylated aryl group. Amongst the compounds especially suitable for the production of these unsymmetrical ureas are p-amino acetanilide, aniline-sulphonic acids, and naphthylamine sulphonic acids, but our invention is not confined to these specific examples. The primary aromatic amino bodies which may be used in our process are represented by the general formula $$H_2N-R$$

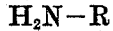

wherein R represents a non-hydroxylated aryl group or residue.

The unsymmetrical ureas can be coupled with any of the known diazo compounds to give a new range of azo dyestuffs. According to the nature of the diazo compound chosen, these dyestuffs find application for dyeing regenerated cellulose silks, or for dyeing cotton. Mono or disazo dyes may be produced by coupling these unsymmetrical ureas with a diazotized aryl mono amine or a diazotized amino azo compound or a tetrazotized diamino diaryl compound. The monoazo dyes in the form of the free acid may be represented by the probable general formula

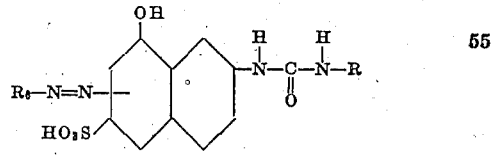

wherein R represents a non-hydroxylated aryl group or residue and $R_6$ represents a monovalent aryl residue. The disazo dyes are of two types. One type may be represented in the form of the free acid by the probable general formula

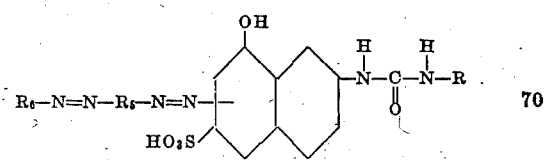

wherein R represents a non-hydroxylated aryl group or residue, $R_5$ represents a divalent aryl residue and $R_6$ represents a monovalent aryl residue or group. The other type of disazo dye may be represented in the form of the free acid by the probable general formula

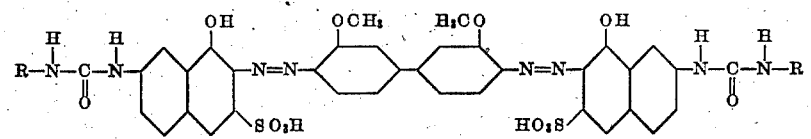

wherein R represents a non-hydroxylated aryl group or residue.

In the present application we do not claim the new ureas, but the new class of dyestuffs obtained from them.

The following examples illustrate the invention, without limiting it, the parts being by weight:—

*Example I*

An aqueous solution of 261 parts of the sodium salt of 2-amino-8-naphthol-6-sulphonic acid and 150 parts of para-aminoacetanilide, containing sufficient sodium acetate to maintain the mixture neutral to Congo red paper throughout, is well stirred and phosgene is passed in until no further reaction is obtained with sodium nitrite. The sodium salt of p-acetamidophenyl-8-hydroxy-6-sulpho-2-naphthylurea separates and is filtered off. This unsymmetrical urea compound has in the form of the free acid the probable formula

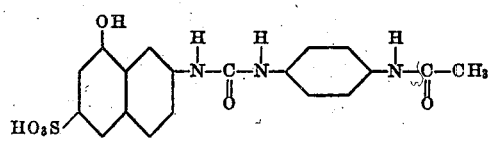

Example II 239 parts of 2-amino-8-naphthol-6-sulphonic acid, dissolved in 2000 parts of water and 40 parts of sodium hydroxide, are mixed with an aqueous solution of 245 parts of the sodium salt of α-naphthylamine-4-sulphonic acid. The mixture is well agitated and phosgene is passed into it, sufficient sodium hydroxide being added to maintain an alkaline reaction throughout. When the reaction is complete the sodium salt of the unsymmetrical urea, 8'-hydroxy-1:2'-dinaphthylurea-4:6'-disulphonic acid, is separated by the addition of common salt. This unsymmetrical dinaphthylurea in the form of the free acid has the probable formula

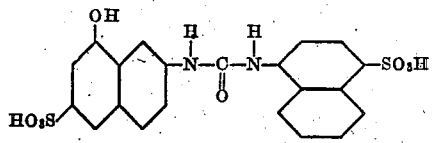

Example III 239 parts of 2-amino-8-naphthol-6-sulphonic acid, dissolved in 2000 parts of water and 106 parts of sodium carbonate, are mixed with an aqueous solution of 245 parts of the sodium salt of β-naphthylamine-6-sulphonic acid. Phosgene is passed into the mixture, which is well agitated and maintained faintly alkaline throughout by the addition of sodium hydroxide. After filtering off the sodium salt of the more insoluble 2:2'-dinaphthylurea-6:6'-disulphonic acid, which separates first, the sodium salt of 8-hydroxy-2:2'-dinaphthylurea-6:6'-disulphonic acid is precipitated by the addition of common salt. This compound in the form of the free acid has the probable formula

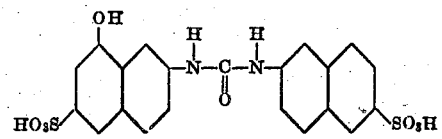

Example IV 319 parts of dehydrothio-p-toluidine sulphonic acid are diazotized with 69 parts of sodium nitrite and 300 parts of 36 per cent hydrochloric acid in the usual way and the suspension of diazo compound formed is run into a cold, well-stirred, aqueous solution of 437 parts of the sodium salt of p-acetamidophenyl-8-hydroxy-6-sulpho-2-naphthylurea acid and 500 parts of sodium carbonate. The mixture is maintained alkaline and stirred until coupling is complete, when it is heated up and the dyestuff isolated by the addition of common salt. The dyestuff obtained dyes viscose silk in Bordeaux-red shades. It is a dark brown powder giving a bluish-red solution in water and in aqueous alkali, the colour changing to brown on acidification; the dye dissolves in concentrated sulphuric acid with a deep crimson colour, changing on dilution with water first to brown and then to red. The dyestuff in the form of the free acid has the probable formula

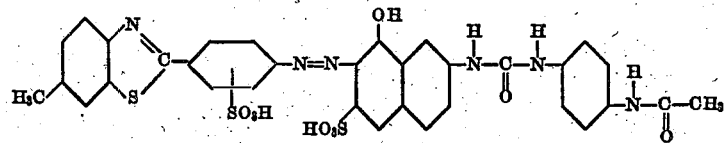

If in place of dehydro-thio-p-toluidine sulphonic acid, 277 parts of p-amono azo benzene-sulphonic acid are diazotized with 69 parts of sodium nitrite in the usual way and coupled in alkaline solution, there is similarly obtained a dyestuff which dyes cotton a claret shade. The disazo dye so obtained in the form of the free acid has the probable formula

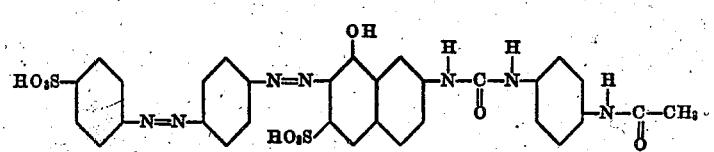

Likewise other diazotizable compounds may be substituted for the dehydrothiotoluidine sulphonic acid used in Example IV. If p-chloroaniline is used there is obtained a product which dyes viscose silk an even red shade. This monoazo dyestuff may be represented in the form of the free acid by the probable formula The substitution of 122 parts of dianisidine for the p-chloraniline in the above example (Example V) results in the formation of a dyestuff which gives violet shades on cotton. This disazo dyestuff in the form of the free acid has the probable formula

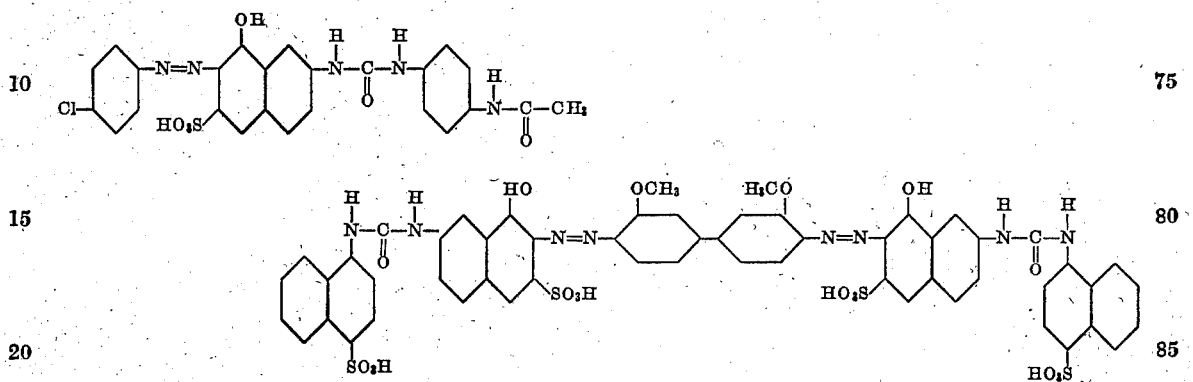

When aminoazo compounds are diazotized and coupled disazo dyes are obtained. For instance the aminoazo compound formed by coupling diazotized metanilic acid with alpha-naphthylamine is used, there is produced a product which dyes cotton blue. This disazo dye in the form of the free acid has the probable formula

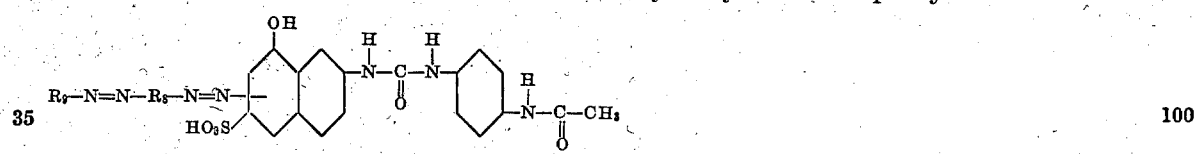

wherein $R_8$ represents the divalent residue from the alpha-naphthylamine and $R_9$ represents the monovalent sulphonated phenyl residue from the metanilic acid. The exact position of the coupling is not known.

Example V 532 parts of the sodium salt of 8'-hydroxy-1:2'-dinaphthylurea-4:6'-disulphonic acid obtained as described in Example II, are dissolved in water and 250 parts of sodium carbonate. To this solution, cooled and well agitated, is added the diazo solution obtained by treating 127.5 parts of para-chloraniline with 69 parts of sodium nitrite in the usual way. The mixture is maintained alkaline and stirred until coupling is complete, when it is heated up and the dyestuff isolated by the addition of common salt. The dyestuff obtained dyes viscose silk a red shade. This monoazo dyestuff in the form of the free acid has the probable formula

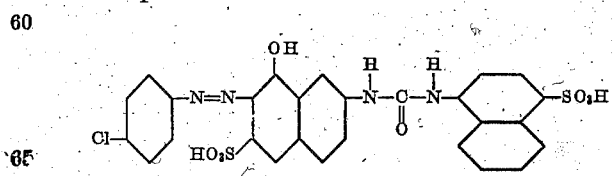

Example VI 127.5 parts of para-chloraniline are diazotized with 69 parts of sodium nitrite and 250 parts of 36 per cent hydrochloric acid in the usual way. The diazo solution is run into a cold well-stirred solution of 488 parts of 8-hydroxy-2:2'-dinaphthylurea-6:6'-disulphonic acid and 370 parts of sodium carbonate. The mixture is maintained alkaline and stirred until coupling is complete. It is then heated up and the dyestuff separated by the addition of common salt. The dyestuff obtained dyes viscose silk a red shade. This monoazo dyestuff in the form of the free acid has the probable formula

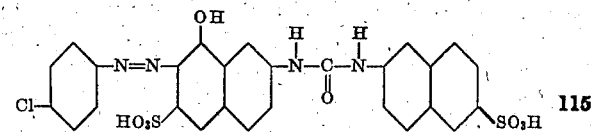

In the structural formulæ given the probable formula is indicated, as the exact position of the coupling is not definitely known.

What we claim and desire to secure by Letters Patent is:—

1. A process of manufacture of new dyestuffs consisting in combining a diazo compound with a new urea represented by the general formula:

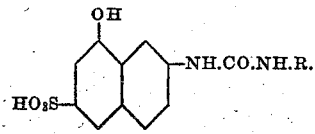

in which R represents a phenyl or naphthyl residue, said residue being nonhydroxylated.

2. A process of manufacture of a new dyestuff consisting in coupling diazotized dehydrothio-p-toluidine sulphonic acid in alkaline solution with p-acetamidophenyl-8-hydroxy-6-sulpho-2-naphthyl-urea.

3. The new dyestuff obtained by combining a diazo compound with a new urea represented by the general formula:

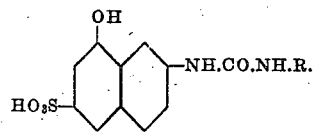

in which R represents a phenyl or naphthyl residue, said residue being nonhydroxylated, which dyes regenerated cellulose silks and cotton in level shades.

4. The new dyestuff obtained by coupling diazotized dehydrothio-p-toluidine sulphonic acid in alkaline solution with p-acetamidophenyl-8-hydoxy-6-sulpho-2-naphthyl-urea, which has the form of a dark brown powder, giving a bluish-red solution in water and in aqueous alkali, the colour changing to brown on acidification; and which dissolves in concentrated sulphuric acid with a deep crimson colour, changing on dilution with water first to brown and then to red.

5. In the manufacture of new monoazo dyestuffs, the process which comprises combining a new urea having the general formula:

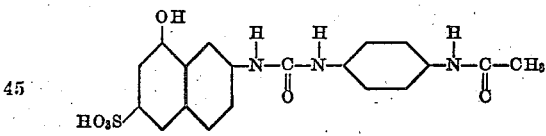

with a diazo compound.

6. As new monoazo dyestuffs, the compounds obtained by coupling a diazo compound with a new urea represented by the general formula

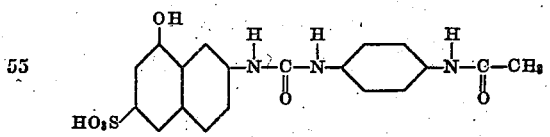

the said dyestuffs dyeing regenerated cellulose silks and cotton in level shades.

In testimony whereof we affix our signatures.

JAMES BADDILEY.
PERCY CHORLEY.
RAINALD BRIGHTMAN.